United States Patent
Kodeboyina

(10) Patent No.: US 8,880,727 B1
(45) Date of Patent: Nov. 4, 2014

(54) TRANSPARENTLY PROVIDING LAYER TWO (L2) SERVICES ACROSS INTERMEDIATE COMPUTER NETWORKS

(75) Inventor: Chaitanya Kodeboyina, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/437,524

(22) Filed: Apr. 2, 2012

Related U.S. Application Data

(63) Continuation of application No. 12/973,559, filed on Dec. 20, 2010, now Pat. No. 8,151,000, which is a continuation of application No. 10/821,791, filed on Apr. 9, 2004, now Pat. No. 7,856,509.

(51) Int. Cl.
*G06F 15/173* (2006.01)

(52) U.S. Cl.
USPC ............ 709/238; 709/239; 709/240; 709/241; 709/242; 709/245; 370/255; 370/352; 370/395.53

(58) Field of Classification Search
CPC .......... H04L 45/00; H04L 45/50; H04L 45/66
USPC .................. 709/238–244, 245; 370/255, 352, 370/395.53
See application file for complete search history.

(56) References Cited

U.S. PATENT DOCUMENTS

| | | |
|---|---|---|
| 5,600,642 A | 2/1997 | Pauwels et al. |
| 6,374,303 B1 | 4/2002 | Armitage et al. |
| 6,493,349 B1 | 12/2002 | Casey |
| 6,501,754 B1 | 12/2002 | Ohba et al. |
| 6,731,652 B2 | 5/2004 | Ramfelt et al. |
| 6,751,218 B1 | 6/2004 | Hagirahim et al. |
| 6,778,531 B1 | 8/2004 | Kodialam et al. |
| 6,807,182 B1 | 10/2004 | Dolphin et al. |
| 6,879,594 B1 | 4/2005 | Lee et al. |
| 7,035,226 B2 | 4/2006 | Enoki et al. |
| 7,082,102 B1 | 7/2006 | Wright |
| 7,095,738 B1 * | 8/2006 | Desanti ........................ 370/389 |
| 7,133,928 B2 | 11/2006 | McCanne |
| 7,221,675 B2 * | 5/2007 | Bryden et al. ................ 370/392 |
| 7,269,135 B2 | 9/2007 | Frick et al. |

(Continued)

FOREIGN PATENT DOCUMENTS

| | | |
|---|---|---|
| KR | 2004001206 | 1/2004 |
| WO | 2004071032 A1 | 8/2004 |

OTHER PUBLICATIONS

Kompella, V., et al, "Virtual Private LAN Services over MPLS", draft-ietf-ppvpn-vpls-ldp-00.txt, Jun. 2003.*

(Continued)

*Primary Examiner* — Michael C Lai
(74) *Attorney, Agent, or Firm* — Shumaker & Sieffert, P.A.

(57) ABSTRACT

A device provides layer two (L2) services between customer networks that are coupled by one or more intermediate computer networks. The device comprises a routing process that receives label information for a label switched path (LSP) through the intermediate networks. The device further comprises a L2 service that receives L2 service information from a device associated with second customer networks. In accordance with the label information, the device transports L2 communications between the first and second customer networks through the one or more intermediate networks. By utilizing label information in this manner, the device may minimize the impact of providing L2 services through the intermediate networks.

18 Claims, 6 Drawing Sheets

(56) References Cited

U.S. PATENT DOCUMENTS

| | | | |
|---|---|---|---|
| 7,281,058 B1 | 10/2007 | Shepherd et al. | |
| 7,286,479 B2* | 10/2007 | Bragg | 370/238 |
| 7,333,491 B2 | 2/2008 | Chen et al. | |
| 7,333,509 B1 | 2/2008 | Gadagottu | |
| 7,359,328 B1 | 4/2008 | Allan | |
| 7,359,989 B2* | 4/2008 | Orava et al. | 709/245 |
| 7,420,988 B1 | 9/2008 | Grossman | |
| 7,856,509 B1* | 12/2010 | Kodeboyina | 709/238 |
| 8,151,000 B1* | 4/2012 | Kodeboyina | 709/238 |
| 2002/0071390 A1 | 6/2002 | Reeves et al. | |
| 2002/0181477 A1 | 12/2002 | Mo et al. | |
| 2003/0012215 A1 | 1/2003 | Novaes | |
| 2003/0088696 A1 | 5/2003 | McCanne | |
| 2003/0099235 A1 | 5/2003 | Shin et al. | |
| 2003/0112748 A1 | 6/2003 | Puppa et al. | |
| 2003/0177221 A1 | 9/2003 | Ould-Brahim et al. | |
| 2003/0191937 A1 | 10/2003 | Balissat et al. | |
| 2004/0037279 A1 | 2/2004 | Zelig et al. | |
| 2004/0151181 A1 | 8/2004 | Chu et al. | |
| 2004/0165600 A1* | 8/2004 | Lee | 370/395.53 |
| 2004/0190517 A1 | 9/2004 | Gupta et al. | |
| 2004/0196827 A1* | 10/2004 | Xu et al. | 370/352 |
| 2004/0218536 A1 | 11/2004 | Yasukawa et al. | |
| 2004/0218539 A1* | 11/2004 | Anqud et al. | 370/241 |
| 2004/0223500 A1* | 11/2004 | Sanderson et al. | 370/395.53 |
| 2005/0027782 A1 | 2/2005 | Jalan et al. | |
| 2005/0044262 A1* | 2/2005 | Luo | 709/238 |
| 2005/0097203 A1 | 5/2005 | Unbehagen et al. | |
| 2005/0108419 A1 | 5/2005 | Eubanks | |
| 2005/0111351 A1 | 5/2005 | Shen | |
| 2005/0169270 A1 | 8/2005 | Mutou et al. | |
| 2005/0213513 A1* | 9/2005 | Ngo et al. | 370/254 |
| 2005/0262232 A1 | 11/2005 | Cuervo et al. | |
| 2005/0281192 A1 | 12/2005 | Nadeau et al. | |
| 2006/0013141 A1 | 1/2006 | Mutoh et al. | |
| 2006/0039364 A1 | 2/2006 | Wright | |
| 2006/0047851 A1 | 3/2006 | Voit et al. | |
| 2006/0147204 A1 | 7/2006 | Yasukawa et al. | |
| 2006/0153067 A1 | 7/2006 | Vasseur et al. | |
| 2007/0036162 A1 | 2/2007 | Tingle et al. | |
| 2008/0123654 A1 | 5/2008 | Tse-Au | |

OTHER PUBLICATIONS

"A Comparative Overview of Frame Relay and ATM," Sprint Technical Report, Jun. 2001, 10 pp.

King, K. "Real-World ATM," Oct. 19, 2001, 10 pp.

King, K., "Understanding the Big ATM Picture," Oct. 19, 2001, 16 pp.

Aggarwal et al., "Establishing Point to Multipoint MPLS TE LSPs," submitted to Internet Engineering Task Force (IETF) Feb. 11, 2007, pp. 1-15.

Atlas et al., "MPLS RSVP-TE Interoperability for Local Protection/Fast Reroute," IETF, Jul. 2001, pp. 1-14.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

Awduche, D., et al., "RFC 3209—RSVP-TE: Extensions to RSVP for LSP Tunnels," Network Working Group, Dec. 2001, 64 pgs. http://rfc.sunsite.dk/rfc/rfc3209html.

Rosen, E., et al., "Multicast in MPLS/BGP IP VPNs," draft-rosen-vpn-mcast-07.txt, May 2004, 27 pgs.

Kompella, K., et al., "Virtual Private LAN Service," draft-ietf-l2vpn-vpls-bgp-00.bd, May 2003, 22 pgs.

Kompella, V., et al., "Virtual Private LAN Services over MPLS," draft-ietf-ppvpn-vpls-ldp-00.txt, Jun. 2003.

RSVP-TE: Resource Reservation Protocol—Traffic Extension, Javvin Company, 2 pgs, printed Apr. 18, 2005. http://www.javvin.com/protocolRSVPTE.html.

Deering, S. et al., "Protocol Independent Multicast-Sparse Mode (PIM-SM): Motivation and Architecture," draft-ietf-idmr-pim-arch-05.txt, Aug. 4, 1998, 30 pgs.

Rekhter, Y. et al., "A Border Gateway Protocol 4 (BGP-4)," Mar. 1995, 72 pgs.

Yasukawa et al. "Requirements for Point to Multipoint extension to RSVP-TE," IETF, Oct. 2003, pp. 1-20.

Zimmermann, "OSI Reference Model—The ISO Model of Architecture for Open Systems Interconnection," IEEE Transactions on Communications, vol. 28, No. 4, Apr. 1980, pp. 425-432.

Andersson et al., RFC 4664, "Framework for Layer 2 Virtual Private Networks (L2VPNs)," Network Working Group, Sep. 2006, 45 pp.

Bryant et al., RFC 3985, "Pseudo Wire Emulation Edge-to-Edge (PWE3) Architecture," Mar. 2005, 40 pp.

Knight et al., RFC 2338, "Virtual Router Redundancy Protocol," Apr. 1998, 26 pp.

Kompella et al., RFC 4761, "Virtual Private Lan Service (VPLS) Using Border Gateway Protocol (BGP) for Auto-Discovery and Signaling," Jan. 2007, 29 pp.

Lasserre et al., RFC 4762, "Virtual Private LAN Service (VPLS) Using Label Distribution Protocol (LDP) Signaling," Jan. 2007, 32 pp.

Juniper® Networks white paper, "Solutions for Deploying Server Virtualization in Data Center Networks," Feb. 2011, 14 pp.

Juniper® Networks white paper, "Implementing VMWare Server Virtualization on Juniper Networks Infrastructure," Oct. 2009, 28 pp.

Juniper® Networks white paper, "Implementing VPLS for Data Center Interconnectivity," Jan. 2011, 47 pp.

U.S. Appl. No. 13/156,214, by Ramasamy Ramanathan, filed Jun. 8, 2011.

U.S. Appl. No. 12/973,559, by Chaitanya Kodeboyina, filed Dec. 20, 2010.

* cited by examiner ical Field

The invention relates to computer networks, and more particularly, to techniques for establishing communications within computer networks.

TRANSPARENTLY PROVIDING LAYER TWO (L2) SERVICES ACROSS INTERMEDIATE COMPUTER NETWORKS

This application is a continuation of U.S. application Ser. No. 12/973,559, now U.S. Pat. No. 8,151,000, filed Dec. 20, 2010, which is a continuation of U.S. application Ser. No. 10/821,791, now U.S. Pat. No. 7,856,509, filed Apr. 9, 2004, the entire contents of each of which are incorporated herein by reference.

TECHNICAL FIELD

The invention relates to computer networks, and more particularly, to techniques for establishing communications within computer networks.

BACKGROUND

Networks that primarily utilize data link layer devices are often referred to as layer two (L2) networks. A data link layer device is a device that operates within the second layer of the Open Systems Interconnection (OSI) reference model, i.e., the data link layer. One example of a data link layer device is a customer premises equipment (CPE) device, such as a switch, modem, Ethernet card, or wireless access point. Traditional L2 networks include Ethernet networks, Asynchronous Transfer Mode (ATM) networks, Frame Relay networks, networks using High Level Data Link Control (HDLC), Point-to-Point (PPP) connections, PPP sessions from Layer 2 Tunneling Protocol (L2TP) tunnels, and Virtual Local Area Networks (VLANs).

In some instances, a layer three (L3) network is used as an intermediate transport network between two or more L2 networks in order to allow communication between the L2 networks. In this type of configuration, the L3 network transparently transports L2 communication between the L2 networks, thereby allowing the L2 networks to share an L2 service. Common protocols for transporting the L2 service through the intermediate L3 network are label switching protocols, such as Multi-protocol Label Switching (MPLS) protocols like Resource Reservation Protocol (RSVP) and the Label Distribution Protocol (LDP). In accordance with MPLS, a source device, such as a router connected to one of the L2 networks, can request a path through the intermediate network. This path, referred to as a Label Switched Path (LSP), defines one or more distinct, dedicated, and guaranteed paths through the network to carry MPLS packets from the source to the destination. The MPLS packets encapsulate the L2 communications, thereby effectively shielding the L3 network from the transported L2 information.

One example of an L2 service is the Virtual Private LAN Service (VPLS), also referred to as Point-to-multipoint (P2MP) L2 VPNs. In general, VPLS allows two or more remote customer networks to be extended through the intermediate network as if the intermediate network does not exist. In particular, L2 communications, such as Ethernet packets, are transported between customer networks via the intermediate network. In a typical configuration, VPLS-enabled routers that are associated with the customer networks define LSPs within the intermediate network to carry encapsulated L2 communications as if these customer networks were directly attached to the same LAN. To properly communicate via these LSPs, each of these VPLS-enabled routers store L2 information, such as Media Access Control (MAC) addresses, as well as VPLS information, such as local and remote VPLS site information. In this manner, these VPLS-enable routers provide transparent L2 connectivity across the intermediate network and simulate a direct LAN.

While a VPLS may provide transparent L2 connectivity across a single intermediate network, establishing L2 connectivity via VPLS across one or more intermediate networks becomes increasingly difficult, especially when the intermediate networks are provided by different service providers. In particular, the intermediate networks may not support VPLS, and the service providers associated with the intermediate networks may be unwilling to do so due to the increased overhead and cost associated with VPLS. For example, the service providers may be unwilling to incur the increased overhead and cost associated with storing and managing the L2 state information associated with the VPLS service.

SUMMARY

In general, techniques are described for providing layer two (L2) services, such as Virtual Private LAN Service (VPLS), across one or more intermediate networks. More specifically, the techniques allow distributed customer networks to achieve L2 connectivity through the intermediate networks without requiring that the intermediate networks maintain L2 state information associated with the L2 service. As one example, the intermediate networks need not provide VPLS services in order to provide L2 connectivity for the service.

In general, the techniques utilize an exterior routing protocol, such as the Border Gateway Protocol (BGP), that has been executed to distribute label information between the intermediate networks. In particular, this extended routing protocol is utilized to distribute label switching associated with a label switching protocol, such as a Multi-protocol Label Switching (MPLS) protocol like Label Distribution Protocol (LDP) or Resource Reservation Protocol (RSVP). In this manner, the techniques provide end-to-end, i.e., inter-provider, LSP connectivity across the intermediate networks.

In addition, the techniques provide for the exchange of L2 service information between the distributed customer networks. In particular, an exterior routing protocol may be utilized to establish a peering relationship between routers associated with the distributed customer networks, thereby allowing the routers to directly exchange the L2 service information. For example, the routers may establish a peering session using the Border Gateway Protocol (BGP), and directly exchange VPLS information via the BGP session. The BGP session could be either an Internal BGP (I-BGP) session or a multihop External BGP (E-BGP) session depending on whether or not the routers exchanging L2 service information are configured to be in the same autonomous system.

In one embodiment, a method comprises establishing a label switched path (LSP) through one or more intermediate networks communicatively coupled between a first customer network and a second customer network. The method further comprises communicating layer two (L2) service information between a first device associated with the first customer network and a second device associated with the second customer network and providing an L2 service in accordance with the L2 service information to transport L2 communications between the first customer network and the second customer network through the one or more intermediate networks using the LSP.

In another embodiment, a device comprises a routing process that receives label information for a label switched path (LSP) through one or more intermediate networks communicatively coupled between a first customer network and a second customer network. The device further comprises a layer two (L2) service that receives L2 service information from a device associated with the second customer network, and transports L2 communications between the first customer network and the second customer network through the one or more intermediate networks in accordance with the label information.

In another embodiment, a system comprises a border router, a first route reflector and an edge router. The border router establishes a label switched path (LSP) through one or more information networks, wherein the LSP communicatively couples a first customer network and a second customer network. The first route reflector associated with the first customer network communicates layer two (L2) service information with a second route reflector associated with the second customer network. The edge router provides an L2 service to the first customer network in accordance with the L2 service information to transport L2 communications between the first customer network and the second customer network through the one or more intermediate networks using the LSP.

The techniques may provide one or more advantages. For example, the end-to-end LSP connectivity and the sharing of the L2 service information allows the routers to establish LSPs across the multiple intermediate networks, and seamlessly provide L2 connectively through the intermediate networks without requiring the intermediate networks maintain L2 state information or otherwise provide the L2 service. In this manner, the intermediate networks need not incur the cost or overhead associated with providing the L2 service. Consequently, seamless L2 connectivity between distributed customer networks may be more easily established in situations where the networks are coupled by multiple intermediate networks.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
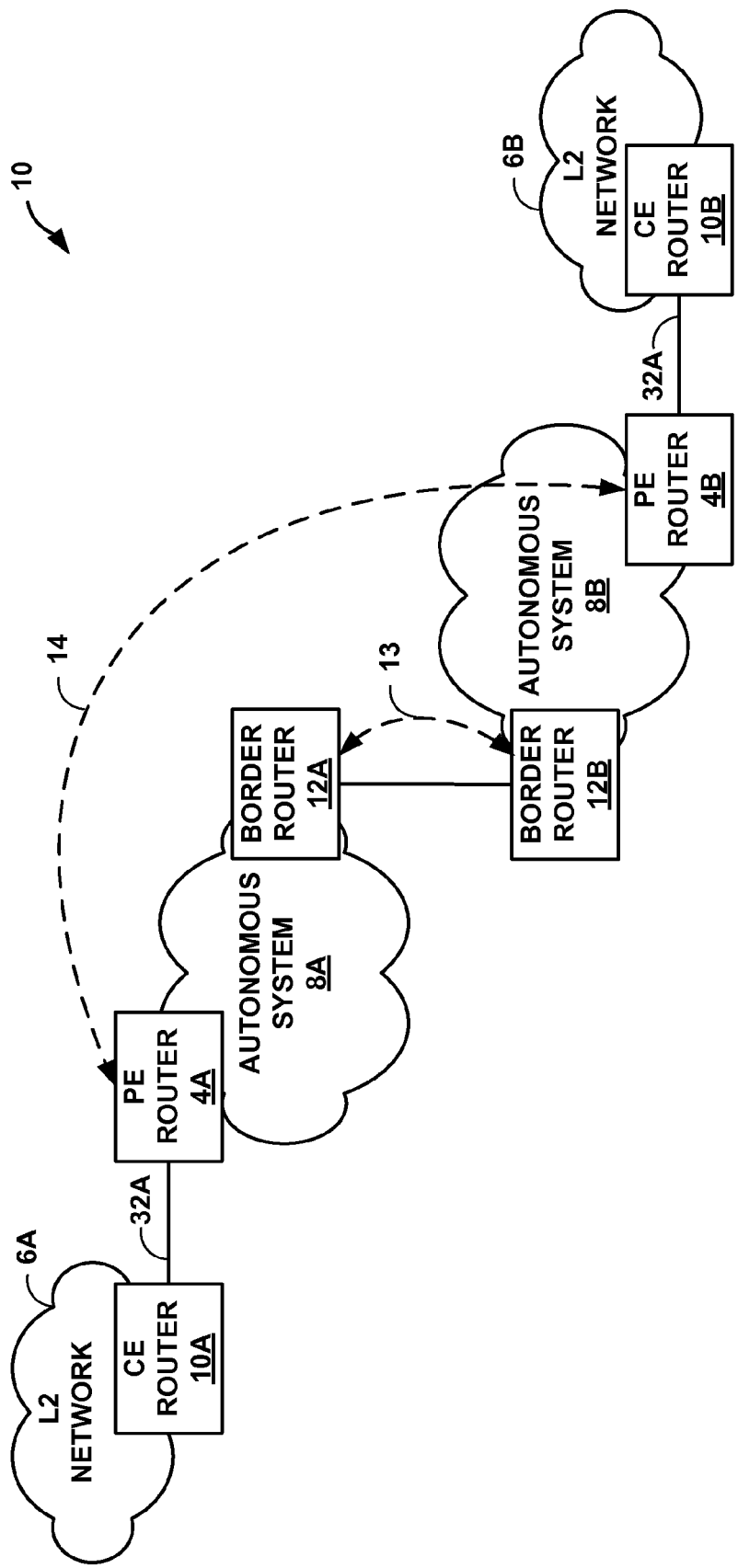
FIG. 1 is a block diagram illustrating an example network environment in which provider edge (PE) routers provide layer two (L2) services for L2 networks through intermediate networks.

FIG. 1 is a block diagram illustrating an example network environment 2 in which provider edge (PE) routers 4A and 4B (collectively, "PE routers 4") provide layer (L2) services for L2 networks 6A and 6B (collectively, "L2 networks 6"). In particular, PE routers 4 exchange L2 information by transparently transporting the L2 information through intermediate autonomous systems 8A and 8B.

In the example of FIG. 1, PE routers 4A and 4B are coupled to customer edge (CE) routers 10A and 10B, respectively, associated with L2 networks 6. Each of CE routers 10A and 10B receives L2 service from a different one of autonomous systems 8A and 8B, which may be maintained by different service providers. Each one of autonomous systems 8A and 8B includes a corresponding one of border routers 12A and 12B (collectively, "border routers 12").

For exemplary purposes, the techniques are described herein in reference to Virtual Private LAN Service (VPLS) and the transportation of Ethernet communications between L2 networks 6. In order to provide VPLS services to L2 networks 6, PE routers 4 communicate with border routers 12 to establish end-to-end label switch paths (LSPs) (not shown in FIG. 1) through autonomous systems 8A and 8B. PE routers 4 and border routers 12 may use any type of label switching protocol to establish the LSPs, such as Multi-protocol Label Switching (MPLS) protocols like Resource Reservation Protocol (RSVP) and the Label Distribution Protocol (LDP).

In general, PE routers 4 receive Ethernet communications from L2 networks 6, and transport the Ethernet communications through autonomous systems 8A and 8B using the LSPs. PE routers 4A, for example, may receive an Ethernet communications from L2 network 6A, encapsulate the Ethernet communications in one or more MPLS packets, and forward the MPLS packet to PE router 4B via one or more LSPs. Upon receipt, PE router 4B extracts the Ethernet communications from the MPLS packets, and injects the Ethernet communications into L2 network 6B. In similar fashion, PE router 4B transports Ethernet communications from L2 network 6B to PE router 4E. In this manner, PE routers 4 provide VPLS services through intermediate autonomous systems 8A and 8B, thereby allowing remote L2 networks 6 to communicate as if directly connected. PE routers 4 may also perform L2 functions, such as MAC frame flooding and forwarding and MAC address learning, in order to provide the VPLS service.

In accordance with the principles of the invention, border routers 12 utilize a routing protocol, such as the Border Gateway Protocol (BGP), that has been extended to distribute label information 13 between autonomous systems 8A and 8B. In particular, border routers 12 utilize this extended routing protocol (referred to herein for exemplary purposes as Label BGP or "L-BGP") to distribute label information 13 associated with a label switching protocol, such as the LDP or MPLS protocol. Border router 12A may, for example, utilize the L-BGP to announce label identifiers for LSPs within autonomous system 8A. Similarly, border router 12B may, for example, utilize L-BGP to announce label identifiers for LSPs within autonomous system 8B. Routing devices within autonomous systems 8A and 8B, such as PE routers 4, receive the label information 13 from border routers 12 via conventional interior routing protocols, such as Interior BGP (I-BGP), ISIS or OSPF, and Multi-protocol Label Switching (MPLS) protocols like Label Distribution Protocol (LDP).

As a result, PE routers 4 are able to construct "end-to-end" LSPs, i.e., LSPs defined through autonomous systems 8A and 8B that originate and terminate on PEs connected to L2 networks 6. In this manner, the techniques provide end-to-end i.e., inter-provider, LSP connectivity across autonomous systems 8A and 8B for transporting L2 communications, e.g., Ethernet packets. The techniques used to establish end-to-end LSPs between the PEs to tunnel L2 communications, can also be used to establish end-to-end LSPs between the CEs routers 10 themselves. In this scenario, CE routers 10A and 10B act as PE routers by encapsulating L2 communications in MPLS, and the PEs act as autonomous system border routers that transport MPLS packets through the intermediate networks.

In addition, in order to increase the transparency of the VPLS L2 service, devices associated with L2 networks 6 are configured to directly exchange VPLS service information 14. For example, PE routers 4 or other devices, such as dedicated router reflectors as further described below, establish peering relationships utilizing an exterior routing protocol, such as BGP (BGP). Using these BGP sessions, PE routers 4 directly exchange the L2 service information, e.g., VPLS service information 14.

In this way, other devices within autonomous systems 8A and 8B, such as border routers 12, need not support VPLS or even be aware that communications related the L2 service is being tunneled through the autonomous systems. Consequently, border routers 12 need not be configured to maintain VPLS state information, thereby avoiding the overhead and cost associated with providing the L2 service. Consequently, seamless L2 connectivity between distributed customer networks, such as L2 networks 6, may be more easily established in situations where the networks are coupled by multiple intermediate networks, such as autonomous systems 8A and 8B.

For exemplary purposes, the techniques are described in reference to Virtual Private LAN Service (VPLS) and the transportation of Ethernet communications between L2 networks 6. However, the techniques may readily be applied to other types of L2 services. For example, each of the L2 networks 6 may comprise an ATM network, and PE routers 4 may utilize the techniques to transports ATM cells and other ATM-related L2 information through intermediate autonomous systems 8A and 8B. Other exemplary types of L2 networks for which L2 information may be transported in accordance with the techniques described herein include Frame Relay networks, networks using High Level Data Link Control (HDLC), Point-to-Point (PPP) connections, PPP sessions from Layer 2 Tunneling Protocol (L2TP) tunnels, and Virtual Local Area Networks (VLANs).

Figure 2:
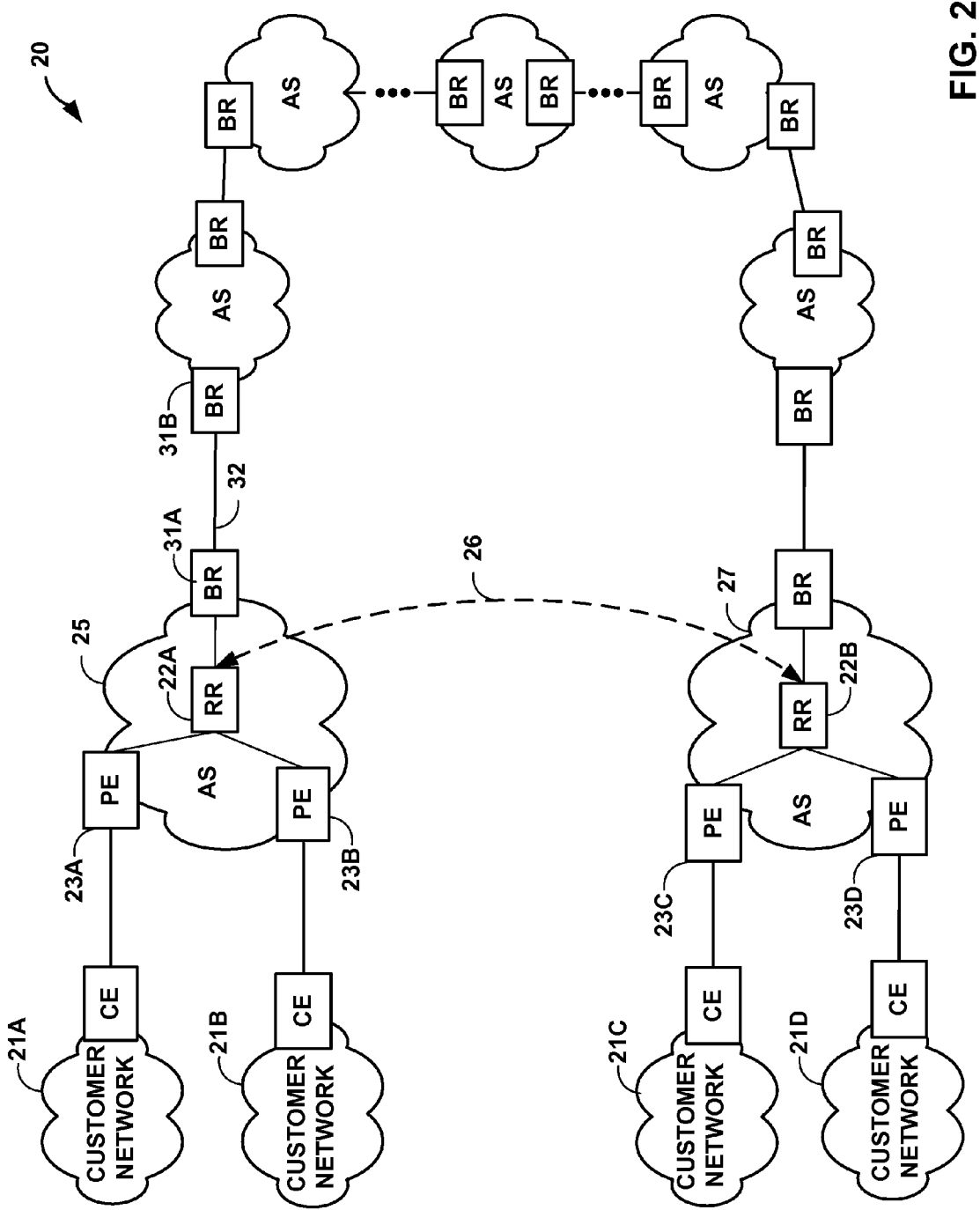
FIG. 2 is a block diagram illustrating another example network environment.

FIG. 2 is a block diagram illustrating another example network environment 20. In particular, FIG. 2 illustrates that the techniques may be applied to an environment regardless of the number of intermediate autonomous systems. In this example, PE routers 23A-23D provide VPLS services for respective customer networks 21A-21D, and transport Ethernet communications through the intermediate autonomous systems ("AS" in FIG. 2) to provide L2 connectivity between the customer networks.

Border routers ("BR" in FIG. 2) utilize an extended routing protocol, such as L-BGP, to distribute label information between the intermediate autonomous systems ("AS" in FIG. 2), thereby providing end-to-end LSP connectivity between the L2 networks.

In addition, autonomous systems 25 and 27 include route reflectors ("RR" in FIG. 2) 22A and 22B, respectively, that communicate utilizing an exterior routing protocol, such as BGP (BGP). For example, if autonomous systems 25 and 27 are configured with the same autonomous system number, they could use Interior BGP (I-BGP) routing communications to exchange L2 service information, otherwise they could use multi-hop Exterior BGP (E-BGP) routing communications. Using BGP routing communications, route reflectors 22A and 22B exchange the L2 service information, e.g., VPLS service information 26. In this manner, route reflectors 22A and 22B may be viewed as intermediate route relay devices.

VPLS service information 26 may, for example, include L2 site data, such as site-id's of remote sites, VPN domains to which these sites belong, and any information required to forward traffic to these sites or other L2 information. Route reflectors 22A and 22B forward VPLS service information 26 to the PE routers associated with the L2 networks for use in providing the VPLS service through the intermediate autonomous systems. In this manner, route reflectors 22A and 22B provide a mechanism for readily sharing L2 VPLS information between the numerous PE routers connected to remote L2 networks.

Figure 3:
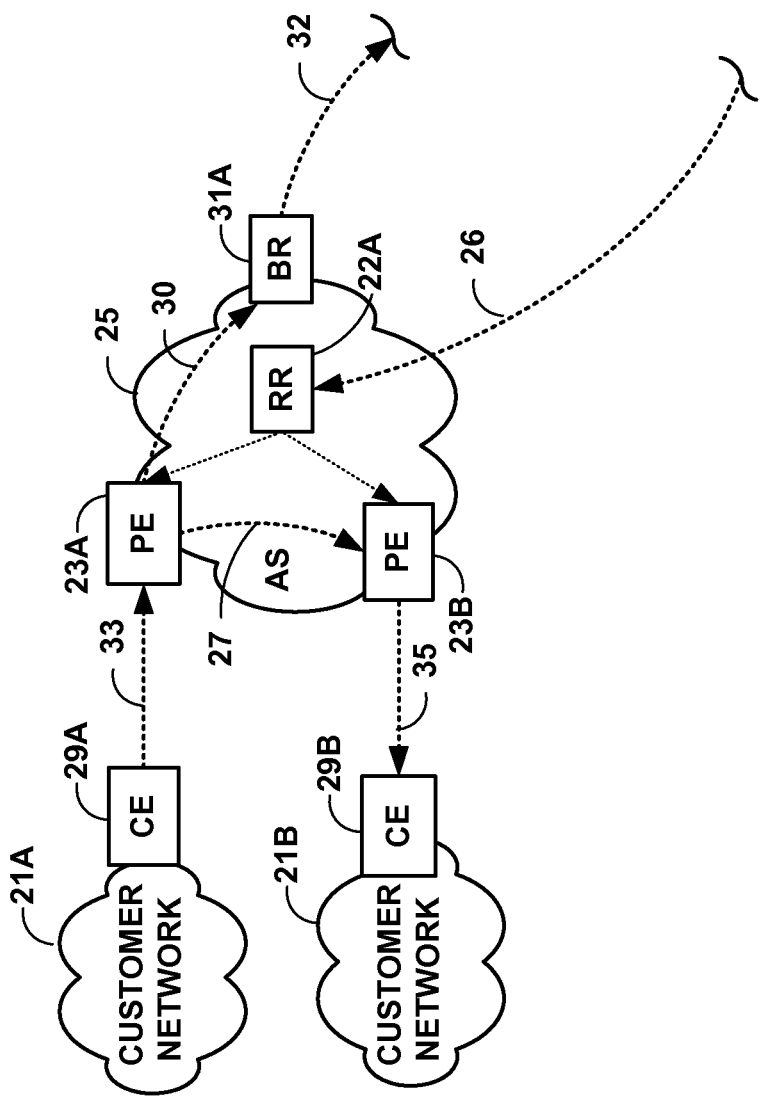
FIG. 3 illustrates a portion of the network environment of FIG. 2 in further detail.

FIG. 3 illustrates a portion of the network environment 20 of FIG. 2 in further detail. In this example, PE routers 23A and 23B provide VPLS services for customer networks 21A and 21B, respectively. In particular, FIG. 3 further illustrates certain communications within network environment 20 and, in particular, within autonomous system 25. For ease of illustration purposes, not all communications within autonomous system 25 are shown.

In this example, route reflector 22A receives VPLS service information 26 from route reflector 22B (FIG. 2), and forwards the VPLS service information, e.g., L2 site information, to PE routers 23A and 23B. Conventional route reflectors change next-hop information when exchanging route information via an external routing protocol like E-BGP, however route reflector 22A and 22B are typically configured so as not to change the next-hop information. Thus, route reflectors 22A and 22B maintain the transparency of the VPLS services by suggesting that PE routers connected to customer networks 22C and 22D are next-hops. In other words, by not changing the next-hop information to include route reflectors 22A and 22B even though route reflectors 22A and 22B are using an external routing protocol, PE routers 23A and 23B assume that other PE routers 23C and 23D, respectively, are next-hops, i.e., directly connected. PE routers 23A and 23B update internal routing information and state data associated with the L2 VPLS service based on the received VPLS state information.

PE router 23A receives Ethernet communications 33 from CE router 21A, and formulates packets for transporting the Ethernet communications to other customer networks in accordance with the VPLS service. PE routers 23A may, for example, encapsulate Ethernet communications 33 in one or more MPLS packets and forward the MPLS packets to PE router 23B via LSP 27. In turn, PE router 23B extracts the Ethernet communications from the MPLS packets, and forwards the Ethernet communications 35 to customer network 21B.

In addition, border router 31A may establish LSP 32 by communicating with a border router of an intermediate autonomous system via L-BGP. An L-BGP compliant update message associated with one or more advertised routes may include, for example, a Subsequent Address Family Identifier (SAFI) field and Network Layer Reachability Information (NLRI) field for advertising prefixes with MPLS labels that can be used to reach them, to nearby routers. The SAFI field identifies the nature of the information stored in the NLRI field and is set to a predefined value when the NLRI field contains label switching protocol labels and prefixes reachable via the labels. Border router 31A establishes LSP 32 by sending an L-BGP update message having the SAFI field set to the predefined value and the NLRI field set to contain the label of LSP 32 to border router 31B. Border router 31B and subsequent routers forward similar update messages until LSP 32 connects to customer network 21C and 21D (FIG. 2), thereby "stretching" LSP 32 to provide end-to-end connectivity. In this process, label switching state for LSP 32 is setup along the path of the LSP in various intermediate autonomous systems.

In addition, based on the L2 site information learned from route reflector 22A, PE router 23A forwards the MPLS packets to border router 31A via LSP 32. Border router 31A in turn forwards the MPLS packets via LSP 32 to other remote customer networks, such as customer networks 21C and 21D.

Figure 4:
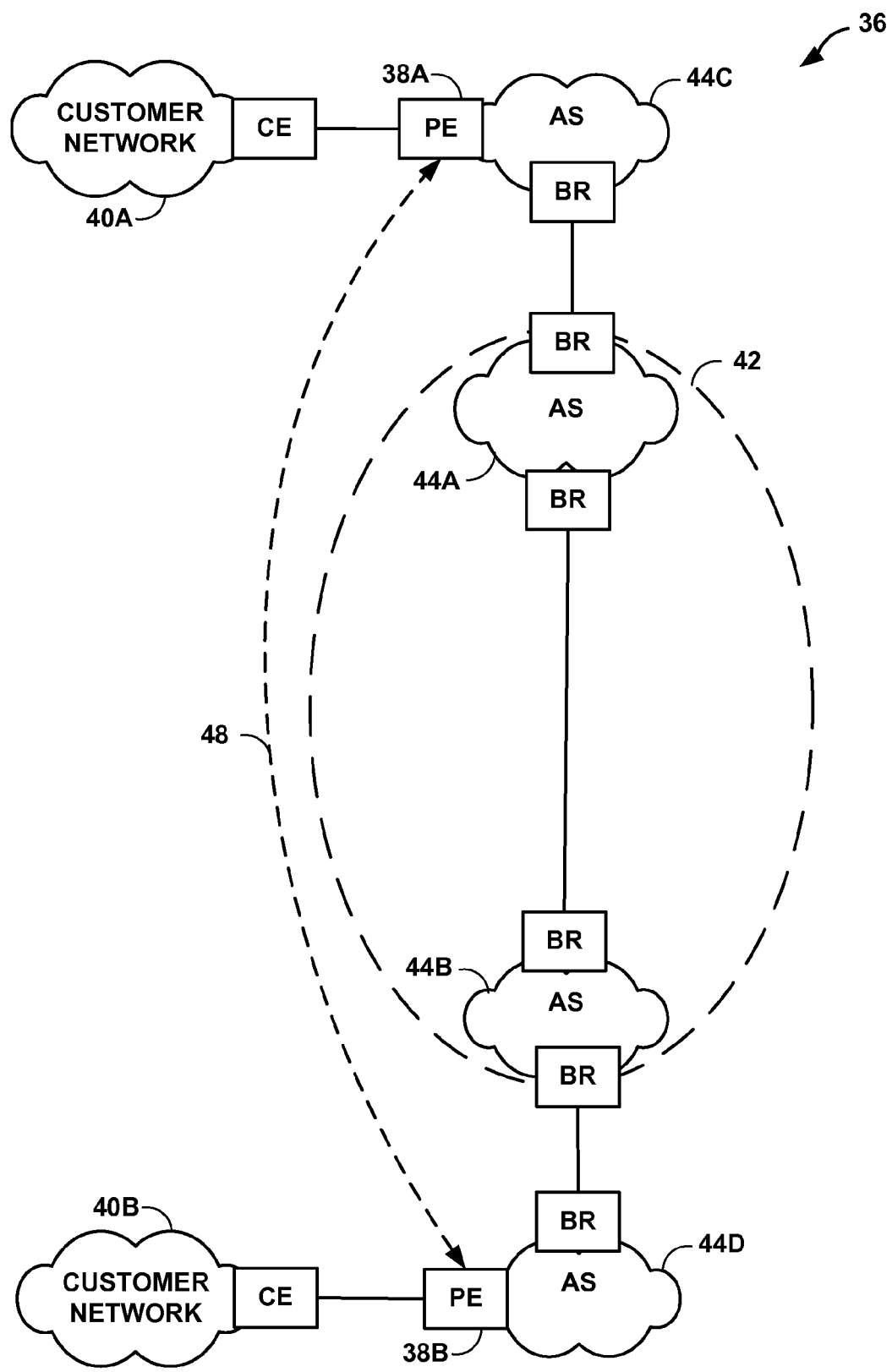
FIG. 4 is a block diagram illustrating another example network environment.

FIG. 4 is a block diagram illustrating another example network environment 36. In particular, FIG. 4 illustrates that the techniques may be applied to an environment regardless of the level of network abstraction. In this example, PE routers 38A and 38B provide VPLS services for respective customer networks 40A and 40B, and transport Ethernet communications through confederation 42 to provide L2 connectivity between the customer networks. Confederation 42 may comprise a plurality of autonomous systems, such as autonomous systems ("AS" in FIG. 4) 44A and 44B, and possibly additional customer networks (not shown), coupled together to form confederation 42.

Border routers ("BR" in FIG. 4) of confederation 42, e.g., border routers 46A and 46B, utilize an extended routing protocol, such as L-BGP, to distribute label information between confederation 42 and autonomous systems 44C and 44D. Within confederation 42, border routers may again utilize L-BGP or some other extended routing protocol to distribute label information between intermediate autonomous systems, such as autonomous systems 44A and 44B, included within confederation 42. In this manner, end-to-end LSP connectivity between the customer networks 40A and 40B may be established through confederation 42, i.e., through higher levels of network abstraction.

In addition, PE routers 38A and 38B communicate utilizing an exterior routing protocol, such as Exterior BGP (EBGP). Using EBGP, PE routers 38A and 38B exchange L2 service information, e.g., VPLS service information 48. VPLS service information 48, as described above, may, for example, include L2 site data, such as site-id's of remote sites, VPN domains to which these sites belong, and any information required to forward traffic to these sites or other L2 information. In this manner, a mechanism is established for sharing L2 information between numerous remote L2 networks, e.g., customer networks 40A and 40B, regardless of the level of network abstraction.

Figure 5:
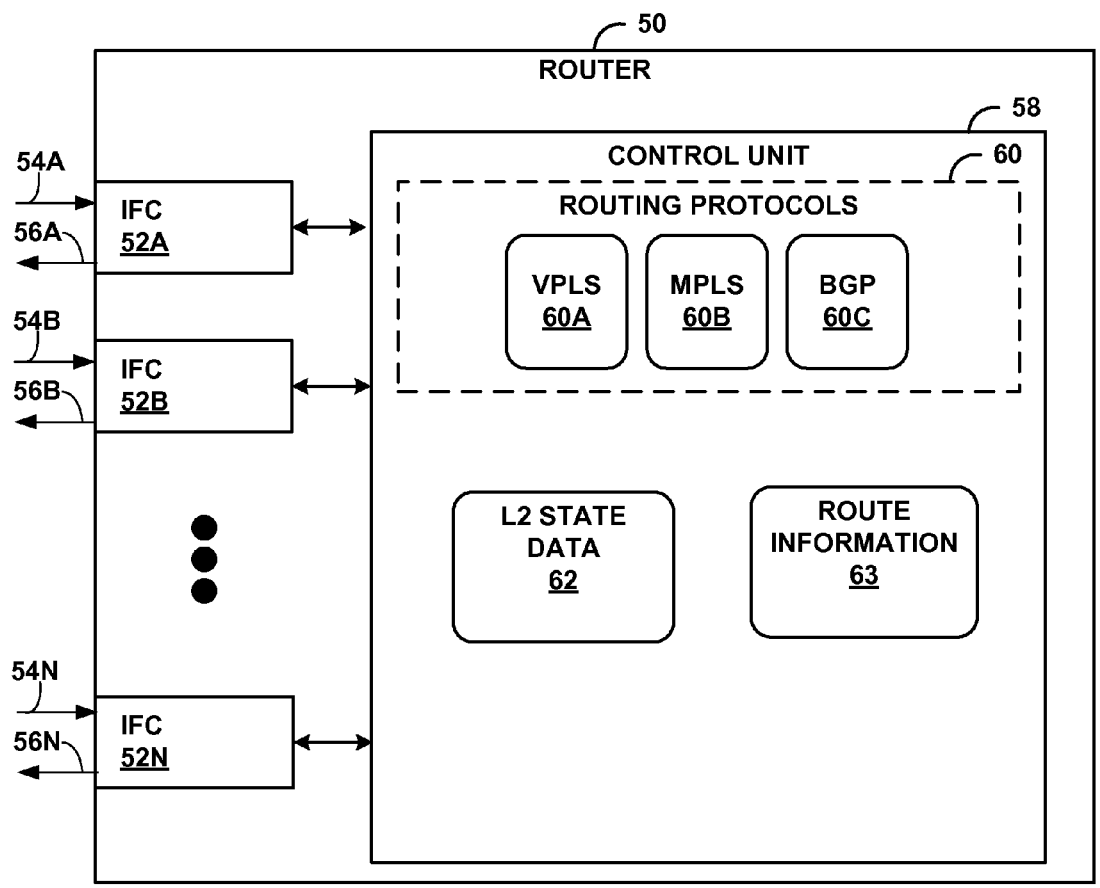
FIG. 5 is a block diagram illustrating an exemplary embodiment of a router that provides VPLS services in accordance with the principles of the invention.

FIG. 5 is a block diagram illustrating an exemplary embodiment of a router 50, such as a PE router, that provides VPLS services in accordance with the principles of the invention. In the exemplary embodiment illustrated in FIG. 5, router 50 includes interface cards (IFCs) 52A-52N (collectively, "IFCs 52") for communicating packets via input links 54A-54N and output links 56A-56N.

In the illustrated embodiment, router 50 includes a control unit 58 that supports a set of protocols 60A to 60C (collectively, "routing protocols 60"). Router 50 utilizes routing protocols 60 to provide VPLS services to customer networks, such as customer network 21A of FIG. 2. More particularly, router 50 utilizes routing protocols 60 to transparently provide VPLS services across intermediate autonomous systems. While illustrated to include MPLS protocol 60B, router 50 may support a wide variety of other protocols. For example, router 50 might support LDP for establishing and maintaining LSPs, interior and exterior routing protocols, or other network protocols. Moreover, router 50 may provide other L2 network services in addition to or instead of VPLS.

In this example, router 50 also includes L2 state data 62 that generally represents the state data necessary to provide services for an L2 network. L2 state date 62 may, for example, specify MAC addresses for the L2 networks. Media Access Control (MAC) address state information, such as MAC addresses, for example, may be learned by MAC flooding and learning procedures during L2 communication.

In addition, router 50 maintains route information 63 that defines routes through a network. Route information 63 may, for example, define next-hops for reaching customer networks and, in some instances, LSPs for transporting data to the customer networks.

As described herein, router 50 may be similar to PE router 23A (FIG. 3), and provide VPLS services to a customer network, such as customer network 21A. In order to provide VPLS services through intermediate autonomous systems, router 50 establishes end-to-end MPLS connectivity with all PE routers associated with the L2 VPN to which router 50 belongs. This may include establishing LSPs to these associated PE routers in accordance with MPLS protocol 60B. When initiating LSPs across the intermediate autonomous systems, border routers utilize L-BGP, for example, to transmit labels associated with these LSPs to adjacent autonomous systems.

Also, in order to provide VPLS services, router 50 exchanges VPLS service information with the other PE routers included within the L2 VPN via a route reflector, such as route reflector 22A. The route reflector utilizes an exterior routing protocol, such as BGP, to exchange the VPLS information between PE routers belonging to the L2 VPN. Router 50 receives the VPLS service information from the route reflector using BGP protocol 60C. Router 50 receives the VPLS service information, and control unit 58 processes the VPLS service information in accordance with BGP protocol 60C by injecting the VPLS service information into route information 63. Control unit 58 resolves route information 63 and associates all of the routes, including the recently injected L2 information, with respective next-hops. In the case of the recently injected L2 information, control unit 58 may associate the L2 information with next-hops that define LSPs. Control unit 58, in accordance with VPLS protocol 60A and its procedures of flooding and learning, further processes the VPLS service information received via BGP protocol 60C to extract L2 state data 62.

Once the L2 VPN is established, router 50 receives L2 data, such as Ethernet frames or ATM cells, via one of links 54A-54N and an associated one or more of IFCs 52. Control unit 58 processes the received L2 data in accordance with VPLS protocol 60A, and accesses L2 state data 62 in order to properly emulate L2 communication through intermediate networks. Control unit 58 selects one or more appropriate LSP to forward the received L2 data by accessing route information 63 and determining one or more next-hops, i.e., selecting an LSP. Control unit 58 encodes the L2 data in accordance with MPLS protocol 60B and transmits the encoded L2 data along the selected LSP. In this manner, router 50 provides VPLS services through intermediate autonomous systems.

The architecture of router 50 illustrated in FIG. 5 is for exemplary purposes only. The invention is not limited to this architecture. In other embodiments, router 50 may be configured in a variety of ways. In one embodiment, for example, control unit 58 and its corresponding functionality may be distributed within IFCs 52. In another embodiment, control unit 58 may include a routing engine that performs route resolution and maintains a routing information base (RIB), and a forwarding engine that performs packet forwarding based on a forwarding information base (FIB). In some embodiments, control unit 58 may include one or more processors which execute software instructions. In that case, the various software modules of control unit 58, such as protocols 60, may comprise executable instructions stored on a computer-readable medium.

Figure 6:
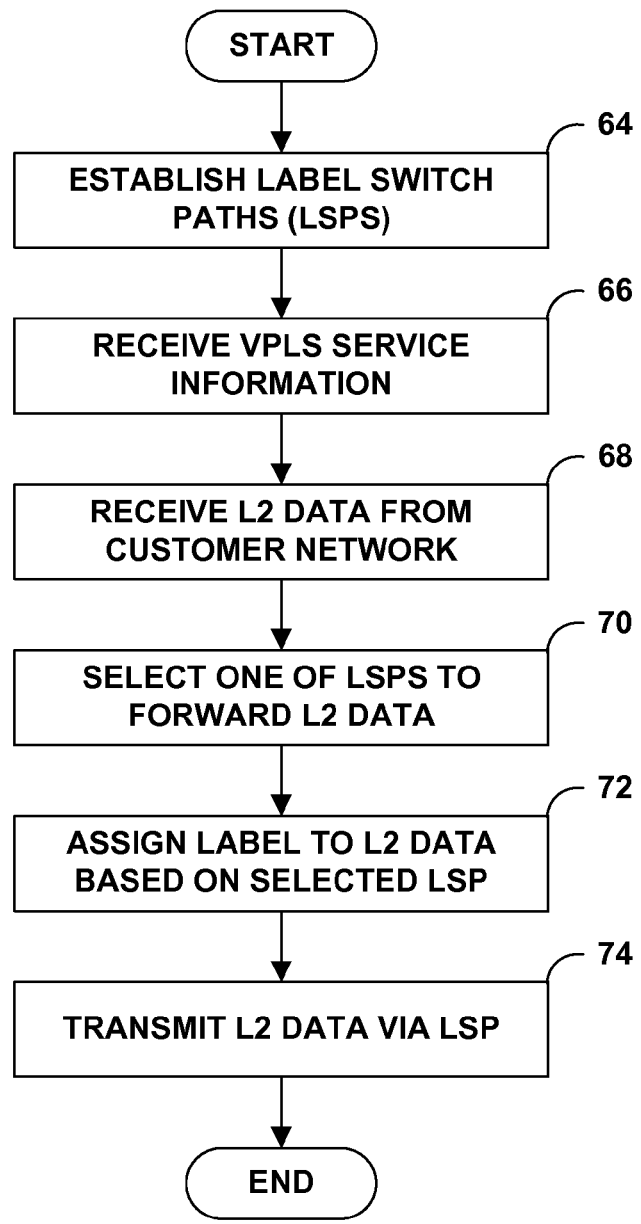
FIG. 6 is a flowchart illustrating exemplary operation of a router in providing VPLS services through intermediate networks in accordance with the principles of the invention.

FIG. 6 is a flowchart illustrating exemplary operation of router 50 (FIG. 5) in providing VPLS services through one or more intermediate networks in accordance with the principles of the invention. Initially, router 50 establishes LSPs (64) in accordance with MPLS protocol 60B. Router 50 may, for example, establish a LSP with every PE router associated with the L2 VPN to which router 50 belongs. In instances where the LSP spans two or more autonomous systems, border routers, such as border router 31A of FIG. 3, transmits a label associated with the LSP via an extended routing protocol, such as L-BGP, as described above. The LSPs may be established dynamically as L2 services are requested or a priori by a system administrator or automated agent. Router 50 updates router information 63 to include MPLS information regarding the end-to-end LSPs.

Router 50 also receives VPLS service information (66) and stores the VPLS service information in route information 63. Typically, route reflectors, such as route reflector 22A and 22B (FIG. 2) establish an EBGP session, whereby VPLS service information may be exchanged and forwarded to router 50 via BGP or some other routing protocol. This VPLS service information is used to exchange information regarding customer L2 sites, such as site-id's and VPN domains to which the sites belong, and allows router 50 to emulate L2 connectivity across intermediate networks.

Once the LSPs are established and VPLS service information is exchanged, router 50 may provide VPLS service to coupled customer networks, such as customer networks 21A-21D (FIG. 2). Router 50 may receive L2 data from one of the coupled customer networks (68). During this process, router 50 maintains L2 state data 62 using, for example, conventional MAC address flooding and learning procedures.

Based on L2 state data 62 and routing information 63, router 50 selects one of the established LSPs to forward the L2 data through the intermediate networks (70). In order to select one of the established LSPs, control unit 58 of router 50 analyzes the L2 data to determine a source Main Access Control (MAC) address and a destination MAC address. Using these addresses, control unit 58 accesses route information 63 and selects a next-hop that typically refers to an egress into one of the established LSPs. Again, conventional procedures for VPLS functions, such as flooding L2 traffic and learning MAC addresses, may be utilized. Whether flooding Ethernet traffic to all remote PEs or forwarding Ethernet traffic to a single remote PE, the principles used to select the next hop information corresponding to a remote PE and encapsulating L2 frames in end-to-end LSPs are the similar.

After selecting the LSP, control unit 58 assigns a label associated with the selected LSP to the received L2 data in accordance with MPLS protocol 60B (72), and transmits the LS data via the selected LSP (74). In reverse order, router 50 receives packets from LSPs, extracts encapsulated L2 data, and forwards the L2 data to one or more L2 networks. In this manner, router 50 provides VPLS services to customer networks that are separated by intermediate networks, e.g., intermediate autonomous systems.

Various embodiments of the invention have been described. These and other embodiments are within the scope of the following claims.

The invention claimed is:

1. A method comprising:
   receiving at a layer three (L3) router, a layer two (L2) communication from an L2 device, wherein the L2 communication includes a Media Access Control (MAC) address for an L2 end-point device in an L2 network;
   by the L3 router, storing, to L2 state data, the MAC address for the L2 end-point device learned from the received L2 communication;
   forwarding L2 communications for the L2 end-point device using the MAC address from the stored L2 state data; and
   in response to receiving the L2 communication, transmitting a routing communication from the L3 router to a peer router, wherein the routing communication is sent in accordance with a routing protocol and specifies the MAC address for the L2 end-point device for the peer router to update local routing information of the peer router for forwarding L2 communications at the peer router using the MAC address to select a label-switched path (LSP) based on the local routing information on which to forward L2 communications through one or more intermediate networks between the L3 router and the peer router.

2. The method of claim 1, wherein the peer router is positioned within a different autonomous system than the L3 router.

3. The method of claim 1, wherein the routing communication comprises an exterior Border Gateway Protocol (E-BGP) routing communication.

4. The method of claim 1, wherein the peer router is positioned within the same autonomous system as the L3 router.

5. The method of claim 1, wherein the routing communication comprises an interior Border Gateway Protocol (I-BGP) routing communication.

6. The method of claim 1, further comprising:
   establishing a peering session in accordance with the routing protocol; and
   transmitting the routing communication over the peering session in accordance with the routing protocol.

7. The method of claim 1, further comprising:
   receiving a plurality of L2 communications from one or more L2 devices, wherein each of the plurality of L2 communications includes a respective MAC address for a respective L2 end-point device in the L2 network;
   by the L3 router, storing to the L2 state data the respective MAC addresses for the respective L2 end-point devices learned from the received plurality of L2 communications; and
   in response to receiving the plurality of L2 communications, transmitting one or more routing communications from the L3 router to the peer router, wherein the one or more routing communications specify the respective MAC addresses for the respective L2 end-point devices for the peer router in to update local routing information of the peer router for forwarding L2 communications at the peer router using the MAC addresses to select a respective LSP based on the local routing information on which to forward L2 communications.

8. The method of claim 1, wherein the routing communication specifies next-hop information used to reach the L2 end-point device.

9. The method of claim 8, further comprising:
   communicating the routing communication to the peer router using an intermediate route relay device; and
   with the intermediate route relay device using a routing protocol, maintaining and relaying the next-hop information unchanged.

10. A method comprising:
    receiving, at a layer three (L3) router, a routing communication from a peer router, wherein the routing communication specifies a Media Access Control (MAC) address for a layer two (L2) end-point device in an L2 network;

by the L3 router, processing the routing communication to extract the MAC address from the routing communication;

by the L3 router, injecting the MAC address into stored route information;

by the L3 router, receiving L2 data over an L2 virtual private network (VPN);

by the L3 router, accessing the MAC address from the stored route information; and forwarding the L2 data to the L2 end-point device using the MAC address to select a label-switched path (LSP) based on the stored route information on which to forward L2 communications through one or more intermediate networks between the L3 router and the peer router.

11. The method of claim 10, wherein the peer router is positioned within a different autonomous system than the L3 router, and wherein the routing communication comprises an exterior Border Gateway Protocol (E-BGP) routing communication.

12. The method of claim 10, wherein the peer router is positioned within the same autonomous system as the L3 router, and wherein the routing communication comprises an interior Border Gateway Protocol (I-BGP) routing communication.

13. A network device comprising:
one or more interface cards configured to communicate packets via input links and output links;
a layer two (L2) service that executes on a control unit of the network device, wherein the L2 service is configured to receive a L2 communication from an L2 device, wherein the L2 communication includes a Media Access Control (MAC) address for an L2 end-point device in an L2 network, store to L2 state data the MAC address for the L2 end-point device learned from the received L2 communication, and forward L2 communications for the L2 end-point device using the MAC address from the stored L2 state data; and
a routing protocol that executes on the control unit, wherein the routing protocol is configured to, in response to receiving the L2 communication, transmit a routing communication to a peer router, wherein the routing communication specifies the MAC address for the L2 end-point device for the peer router to update local routing information of the peer router for forwarding L2 communications at the peer router using the MAC address to select a label-switched path (LSP) based on the local routing information on which to forward L2 communications through one or more intermediate networks between the network device and the peer router.

14. The network device of claim 13,
wherein the peer router is positioned within a different autonomous system than the device, and wherein the routing communication comprises an exterior Border Gateway Protocol (E-BGP) routing communication.

15. The network device of claim 13, wherein the L2 service comprises a Virtual Private Local Area Network Service (VPLS).

16. A network device comprising:
one or more interface cards configured to communicate packets via input links and output links;
a routing protocol that executes on a control unit of the network device, wherein the routing protocol is configured to receive a routing communication from a peer router, wherein the routing communication specifies a Media Access Control (MAC) address for a layer two (L2) end-point device in an L2 network; and
a layer two (L2) service that executes on the control unit, wherein the L2 service is configured to process the routing communication to extract the MAC address from the routing communication, and inject the MAC address into stored route information,
wherein one of the one or more interface cards receives L2 data over an L2 virtual private network (VPN);
wherein the L2 service accesses the MAC address from the stored route information, and forwards the L2 data to the L2 end-point device using the MAC address to select a label-switched path (LSP) based on the stored route information on which to forward L2 communications through one or more intermediate networks between the network device and the peer router.

17. The network device of claim 16,
wherein the peer router is positioned within a different autonomous system than the network device, and wherein the routing communication comprises an exterior Border Gateway Protocol (E-BGP) routing communication.

18. The network device of claim 16, wherein the L2 service comprises a Virtual Private Local Area Network Service (VPLS).

* * * * *